Oct. 27, 1925.  1,559,489
G. L. WILLIAMS
PROCESS OF MAKING HYDRATED ALUMINA AND BY-PRODUCTS
Filed Dec. 29, 1923
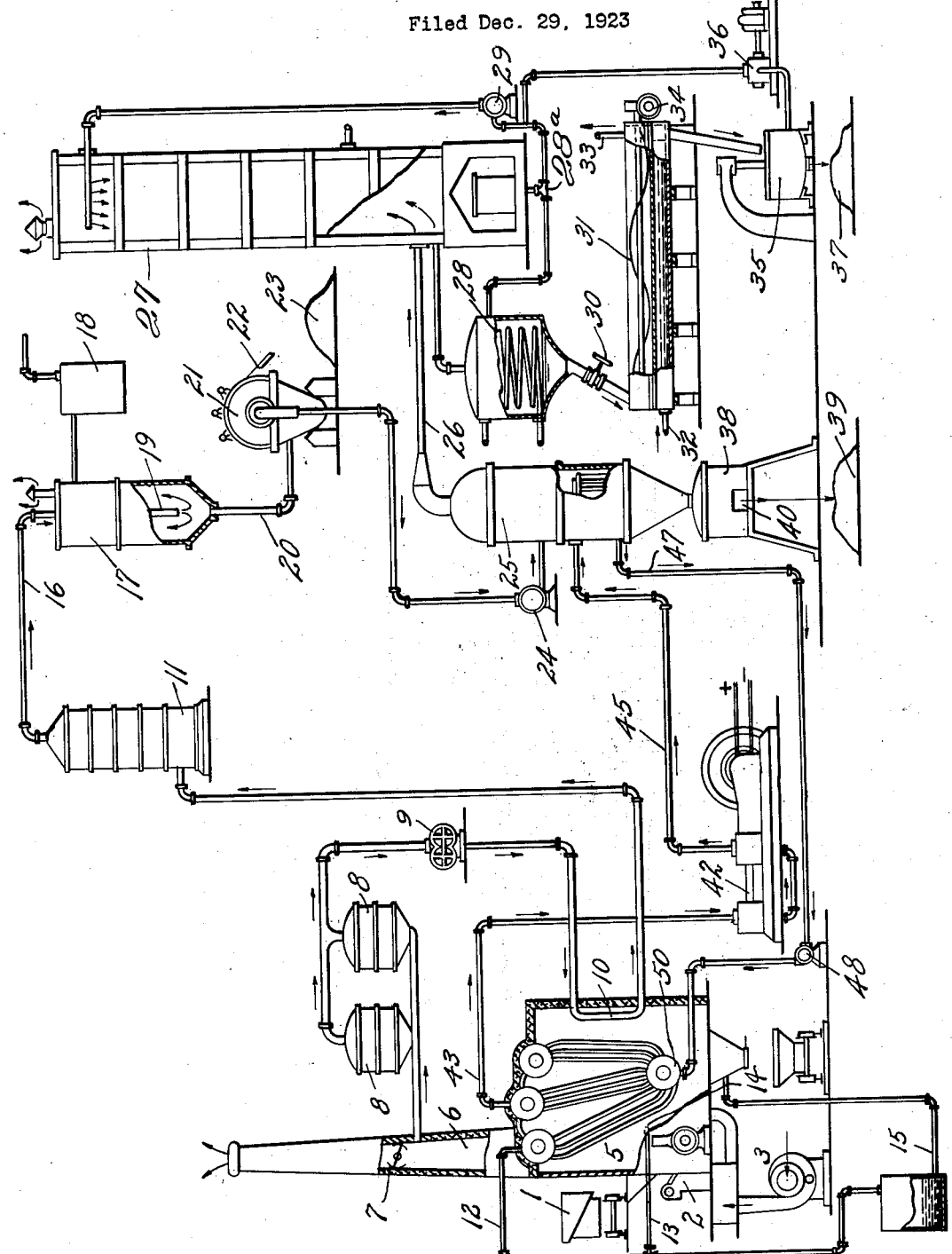
INVENTOR
GLEN LENARDO WILLIAMS
BY KP McElroy
ATTORNEY.

Patented Oct. 27, 1925.

1,559,489

UNITED STATES PATENT OFFICE.

GLEN LENARDO WILLIAMS, OF DETROIT, MICHIGAN.

PROCESS OF MAKING HYDRATED ALUMINA AND BY-PRODUCTS.

Application filed December 29, 1923. Serial No. 683,432.

*To all whom it may concern:*

Be it known that I, GLEN LENARDO WILLIAMS, a citizen of the United States, residing at Detroit, in the county of Wayne and State of Michigan, have invented certain new and useful Improvements in Processes of Making Hydrated Alumina and By-Products, of which the following is a specification.

This invention relates to processes of making hydrated alumina and by-products; and it comprises a method of making hydrated alumina in granular easily handled form and of producing certain valuable by-products, wherein a solution of potassium aluminate is precipitated by the aid of furnace gases resulting from the incomplete combustion of coal and containing fixed nitrogen compounds, carbon dioxid, hydrocarbons and hydrogen, said furnace gases being usually catalyzed to enhance the content of fixed nitrogen therein; the hydrated alumina being separated from the soluble potassium compounds resulting and the latter recovered and the fixed nitrogen compounds in this solution being also recovered; all as more fully hereinafter set forth and as claimed.

Hydrated alumina is a body existing in a variety of different physical forms. It is a colloidal material and its physical properties depend very largely upon the way in which it is produced. Sometimes it comes down as a precipitate from solutions in a slimy gelatinous form almost impossible to filter out and wash, while other forms can be produced which are relatively granular and easy to filter and wash. The present invention relates to the production of one such easily handled form from potassium aluminate solutions.

Potassium aluminate is the name given to a material which can be formed by dissolving alumina in a caustic potash solution and is not of any very definite composition. It can be produced by leaching bauxite with a caustic potash solution. In another way of producing this material which I have elsewhere described and claimed, alunite, which is a natural sulfate of aluminum and potassium, is roasted under such conditions as to expel the sulfur in the form of acid gases and leave a residue containing alumina and potash in combination as potassium aluminate. With many alunites in producing this material it is desirable to have a proportion of potash ($K_2O$) greater than that naturally occurring; and in such cases it is advisable to add some potassium carbonate to the alunite prior to the roasting operation. In this roasting method of producing potassium aluminate, the product is a soft, fritted material which can be dissolved on heating with water, forming a potassium aluminate solution. The use of some pressure is usually advisable in making the solution. Such a solution gives the material which I have more particularly in mind in the present invention.

From any solution of potassium aluminate, the alumina can be precipitated in many ways; the physical consistency of the alumina so recovered however varying materially, as already stated, with the method of precipitation. One such way of precipitation is by passing in ordinary boiler furnace gases which give a precipitate of aluminum hydrate and a solution of potassium carbonate. The character of alumina so obtained varies materially with the composition of the gases and it is, at least often, difficult to separate in filter presses and to wash. I have found that a much better type of precipitate, with the production of a solution containing not only potassium carbonate but also other values which help defray the cost of operation can be obtained by using a certain type of boiler furnace gases resulting from the combustion of bituminous coal with a supply of air not in excess of, and advantageously somewhat less than, that required for complete combustion; i. e., with boiler furnace gases containing some hydrogen and hydrocarbons. If the combustion be effected in the presence of more or less steam the quantity of hydrogen is enhanced. In either event much of the nitrogen of the coal passes forward in volatile combined form. This fixed nitrogen may be here called ammonia, without necessarily implying that it is all in the form of $NH_3$. As a matter of fact it exists as carbonate of ammonia and in various other forms. I find that the presence of ammonia in the precipitating gases is advantageous in obtaining an easily handled form of alumina. And it is useful to add to its quantity by catalyzing the furnace gases to fix a further portion of the contained atmospheric nitrogen prior to their introduction into the solution to be precipitated. This may be effected by passing such gases over a suitable catalyzer. A very good catalyzer for this purpose is obtained by calcining a mixture of magnesium sulfate, titanium sulfate and iron sulfate. Aluminum sulfate may form a further component of the mixture to be calcined. Calcination results in the formation of a catalyzer containing three or four oxids; and such a catalyzer proves unusually efficient for the present purposes.

After precipitation of the alumina and the potassium aluminate, the mother liquor contains not only potassium carbonate but a certain amount of fixed nitrogen; an amount which is worth recovering. And in the present invention I recover this fixed nitrogen in concentrating the mother liquors from the precipitation of alumina from the potassium aluminate.

In the accompanying illustration I have shown more or less diagrammatically, an assemblage of apparatus elements adapted for carrying out the described process. The view is a diagrammatic illustration, partly in elevation and partly in central vertical section of a complete plant for use in performing the described process.

In this showing, element 1 represents fuel conveying means delivering to suitable stoker means 2, supplying fuel to a furnace chamber 5 into which air is fed under pressure by fan 3. All these elements are of usual and ordinary type although, as stated, the air delivering means is so operated as not to furnish an excess of air for combustion. Furnace gases are taken to stack 6 in any usual way and pass thence to exit except for the fraction to be here used, damper 7 being used to adjust the portion going to waste. The portion to be used passes through diagrammatically shown scrubbers 8 under the suction of fan or pump 9. On the delivery side this fan communicates with superheater coil 10 located within the furnace chamber. The superheated gases pass into the base of catalyzer chamber 11 containing the described catalyst. Within the furnace chamber is a conventionally shown boiler having steam delivery pipe 12 supplying the stoker by 13 and also communicating with water supply tank 15 and spraying device 14. This enables water to be sprayed on the ashes in the ash pit and furnish a certain amount of steam within the furnace chamber to regulate combustion and aid in preserving the fixed nitrogen of the coal.

Returning to the catalyzer (11) the catalyzed gases pass through pipe 16 into precipitating tank 17 supplied with potassium aluminate solution from tank 18. As shown, the gases are introduced into the precipitating tank by pipe 19. Precipitated solution is withdrawn from 17 by pipe 20 and sent to filter press 21 which may be of continuously operating type. From the filter press washed alumina hydrate is delivered by 22 to diagrammatically shown pile 23. The liquid from the filter press which contains not only potassium carbonate but various forms of fixed nitrogen compounds is withdrawn by pump 24, and sent to the conventionally shown evaporator 25 within which it is concentrated. Vapors of water and of volatile ammonia compounds pass through 26 into scrubbing tower 27 within which they are scrubbed by downcoming solution from heating vessel 28. As shown this vessel communicates by means of T pipe 28$^a$, both with the base of the scrubbing tower and with a circulating pump 29. The circulating pump allows the liquid in the tower to be circulated repeatedly. Liquid from the base of the tower is kept warm in 28 say at a temperature of 60° C., and as it becomes concentrated in dissolved salines, it is sent by means of valved pipe 30 to crystallizer 31 wherein it is cooled by circulating water or the like entering a suitable jacket by inlet 32 and passing out at 33. Crystallized material from the crystallizer is carried by a suitable stirrer and conveyor driven by 34 and is discharged into a suitable centrifugal 35. Crystallized material is diagrammatically shown at 37. Liquid separated in the centrifugal is taken by pump 36 and redelivered to the circulating system of the tower. Crystallized salts formed in the evaporator (25) go to 38 for separation of liquid and solid, solids being discharged at 40 to form pile 39. The boiler shown actuates engine 42, supplying steam to it through pipe 43. Exhaust from the engine passes through 45 to the described evaporator from which condensate is withdrawn by pipe 47 and pump 48 and reintroduced into the boiler at lower header 50.

In the operation of the above described apparatus potassium aluminate solution is fed through 18 into precipitator casing 17. While potassium aluminate solution from other sources may be employed in the present invention, I prefer the use of a preparation which I make by roasting alunite, usually with added carbonate, under such conditions as to convert it into potassium aluminate. This potassium aluminate is dissolved in water and filtered. This solution is advantageously employed in the present invention.

Into the aluminate solution in 17 are passed, scrubbed and reheated gases from furnace chamber 5. This chamber is supplied with bituminous coal and the coal is burnt with no excess of air in the presence of more or less water vapor. Under these conditions a large part of the fixed nitrogen in the coal goes forward in the form of ammonia, etc., compounds with the combustion gases. These gases also contain considerable amounts of carbon monoxid, hydrogen, carbon dioxid, etc., as well as more or less moisture. The reheated hot gases which may be at a temperature of say 350° C. pass into the base of catalyzer tower 11 and a further portion of nitrogen is fixed at the expense of the atmospheric nitrogen in the gases. The top of the tower may be at a temperature as low as 80° C.; i. e., at a temperature merely high enough to make water vapor pass forward. I have elsewhere described and claimed the production of an efficient catalyzer for use in this tower; said catalyzer consisting substantially of three or four oxids and being produced by roasting a mixture of magnesium, tantalum, aluminum and iron sulfates. The catalyzer is cheap and efficient and as its activity diminishes it may be removed and fresh catalyst supplied.

The gases containing carbon dioxid and various forms of fixed nitrogen go forward by 16 and 19 into potassium aluminate solution, precipitating alumina and producing a mother liquor containing potassium carbonate and various nitrogen compounds. The alumina is separated from the mother liquor and is washed in 21. The mother liquor goes to evaporator 25 where it is concentrated to give crystallized potassium carbonate and vapors and gases containing fixed nitrogen, now mostly in the form of ammonia. These gases are scrubbed in tower 27 and go to waste from its top. The liquid circulating in the tower picks up the ammonia compounds. It is kept warm by 28. When it becomes concentrated portions are removed at 30 and cooled in the crystallizer, this resulting in the deposition of crystalline salts. These are spun out in centrifugal 35 and the mother liquor returned for re-circulation.

What I claim is:—

1. The process of preparing hydrated alumina in granular form which comprises precipitating a solution of potassium aluminate with boiler furnace gases.

2. The process of preparing hydrated alumina in granular form and of recovering valuable by-products which comprises precipitating a potassium aluminate solution with boiler furnace gases containing nitrogen compounds and recoverng potash and ammonia compounds from the mother liquor.

3. The process of preparing hydrated alumina in granular form and of making valuable by-products which comprises burning bituminous coal with an insufficient supply of air, passing the resultant gases into a solution of potassium aluminate thereby precipitating hydrated alumina and recovering potash and nitrogen compounds from the mother liquor.

4. The process of preparing hydrated alumina in granular form and of making valuable by-products which comprises burning bituminous coal with an insufficient supply of air and in the presence of water vapor, passing the resultant gases into a solution of potassium aluminate thereby precipitating hydrated alumina and recovering potash and nitrogen compounds from the mother liquor.

5. The process of preparing hydrated alumina in granular form and of making valuable by-products which comprises burning bituminous coal with an insufficient supply of air, passing the resultant gases over a nitrogen fixing catalyst, passing the treated gases into a solution of potassium aluminate thereby precipitating hydrated alumina and recovering potash and nitrogen compounds from the mother liquor.

6. The process of preparing hydrated alumina in granular form and of making valuable by-products which comprises burning bituminous coal with an insufficient supply of air and in the presence of steam, passing the resultant gases over a nitrogen fixing catalyst, passing the treated gases into a solution of potassium aluminate thereby precipitating hydrated alumina and recovering potash and nitrogen compounds from the mother liquor.

In testimony whereof, I have hereunto affixed my signature.

GLEN LENARDO WILLIAMS.